(12) United States Patent
Hubenthal et al.

(10) Patent No.: US 6,793,823 B2
(45) Date of Patent: Sep. 21, 2004

(54) WASTEWATER SOLIDS REMOVAL METHODS

(75) Inventors: Ronald R. Hubenthal, Roscoe, IL (US); Stephen A. Schupbach, Belvidere, IL (US)

(73) Assignee: Aqua-Aerobics Systems, Inc., Loves Park, IL (US)

( * ) Notice: Subject to any disclaimer, the term of this patent is extended or adjusted under 35 U.S.C. 154(b) by 200 days.

(21) Appl. No.: 10/214,476

(22) Filed: Aug. 7, 2002

(65) Prior Publication Data

US 2004/0026317 A1 Feb. 12, 2004

(51) Int. Cl.[7] ................................................ C02F 3/00
(52) U.S. Cl. ...................................... 210/623; 210/624
(58) Field of Search ................................ 210/623–626, 210/631, 195.3, 197

(56) References Cited

U.S. PATENT DOCUMENTS

| | | | |
|---|---|---|---|
| 6,312,599 B1 | * 11/2001 | Reid | ........................ 210/605 |
| 6,541,312 B2 | 4/2003 | Cleeves et al. | ............. 438/131 |
| 6,627,530 B2 | 9/2003 | Li et al. | ...................... 438/622 |
| 2002/0088998 A1 | 7/2002 | Knall et al. | ................. 257/202 |

\* cited by examiner

*Primary Examiner*—Chester T. Barry

(74) *Attorney, Agent, or Firm*—Niro, Scavone, Haller & Niro

(57) ABSTRACT

In a wastewater treatment process involving activated sludge, the invention provides a method for improving suspended solids removal without the need for chemical coagulants. Improved solids removal is obtained through the reintroduction of return activated sludge as a natural flocculent prior to tertiary filtration. In some applications algal solids can be pre-filtered from equalization or detention ponds and lagoons by return activated sludge addition followed by mixing and high solids filtration. The inventions result in improved solids removal and longer run times for the treatment processes with reduced need for chemical coagulants.

8 Claims, 2 Drawing Sheets

WASTEWATER SOLIDS REMOVAL METHODS

FIELD OF THE INVENTION

The inventions described below apply generally to wastewater treatment processes and systems that employ activated sludge. More specifically, the inventions are directed to the enhanced removal of suspended solids from a fluid stream occasioned by the application of a form of activated sludge during the treatment process.

BACKGROUND OF THE INVENTION

Typical municipal and industrial wastewater streams contain solid particles in a range of sizes and densities. During conventional treatment processes, solids of larger sizes and densities are removed from the waste stream rather easily. Often, as a primary treatment step, the wastewater is detained in a basin where the heavier particles (those having a density greater than the fluid medium carrying them) settle out of the waste stream through the effects of gravity. Smaller and lighter solids, however, remain suspended in the waste stream requiring additional physical and chemical processing for removal.

Following primary treatment, many treatment processes introduce activated sludge into the waste stream for secondary treatment including additional solids removal. As it is well known in the art, activated sludge is a natural beneficial biomass that interacts with the remaining solids in a manner that creates heavier settleable solids that are then more amenable to physical removal. Some suspended solids remain after the secondary treatment phase leaving a wastewater that it often still unsuitable for discharge or reuse.

Subsequent tertiary treatment processes such as filtration will remove additional solids, but removal is limited by the size of the openings in the filter media. To remove particles that would otherwise pass through the filtration process, conventional wastewater treatment methods call for the introduction of chemical coagulants (such as alum, ferric chloride or organic polymers) prior to filtration. Chemical coagulants interact with suspended solids binding individual particles into larger and heavier solids which can then be removed during secondary treatment.

Wastewater treatment plant operators pay a price for this chemical conditioning. The complex polymer chemicals add significantly to the cost of treatment. Additionally, the chemical sludge that is then collected on the filter can quickly clog or "blind" the filter media, requiring frequent, possibly continuous backwashing. This can occur because the combination of the coagulants with the wastewater constituents can create a viscous mat on the filter media. Excessive backwashing reduces the quantity of wastewater that can be treated resulting in either the purchase and installation of more treatment equipment or a reduction in the processes that produce the wastewater. Additionally, the solids removed from the system following chemical addition create a chemical sludge that is more expensive and more difficult to dispose of.

Therefore a method and apparatus for removing suspended solids from a waste stream that reduces or eliminates the need for chemical conditioning is desirable, as well a method and apparatus that is effective at small particle removal that reduces the effect of blinding filter systems and produces a solid waste that is easier to dispose than existing chemical sludges.

The inventions described below reduce or eliminate the need for chemical conditioning of wastewater by reintroducing readily available activated sludge to the treatment process after secondary treatment. An advantage of this method is that activated sludge provides a natural coagulant without the expense of chemical addition as suspended solids are adsorbed onto the activated sludge. The natural waste solids avoid the problems of heavy chemical concentrations and are thus more readily disposable.

Definition of Terms

The following terms are used in the claims of the patent and are intended to have their broadest meaning consistent with the requirements of law:

coagulation—the agglomeration of small, dispersed solids into larger particles more amenable to settling or filtration.

Where alternative meanings are possible, the broadest meaning is intended. All words in the claims are intended to be used in the normal, customary usage of grammar and the English language.

DETAILED DESCRIPTION OF THE PREFERRED EMBODIMENT

Figure 1:
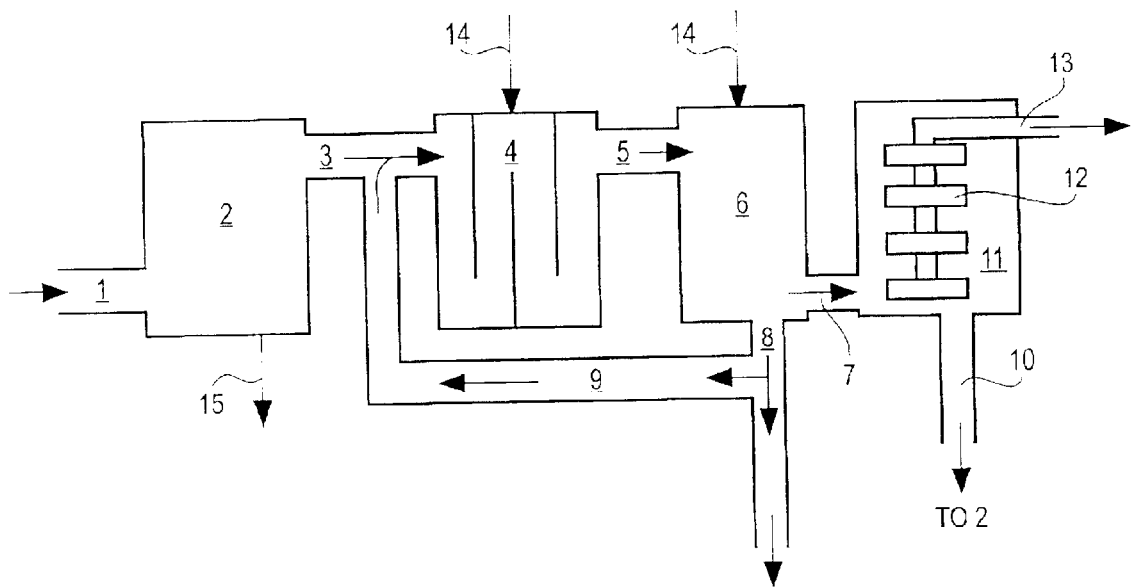
FIG. 1 is a process diagram of a conventional wastewater treatment facility that employs primary, secondary and tertiary treatment techniques.

Set forth below is a description of what is currently believed to be the preferred embodiment or best example of the invention claimed. Future and present alternatives and modifications to this preferred embodiment are contemplated. Any alternatives or modifications which make insubstantial changes in function, in purpose, in structure or in result are intended to be covered by the claims of this patent.

In a conventional wastewater treatment process that is known in the art (see FIG. 1), a wastewater influent 1 is introduced to a primary clarification basin 2. In the primary clarification basin 2, some of the solids that are entrained in the influent 1 settle by gravity to the bottom of the basin 2. This solids separation process produces a primary effluent 3 that is introduced into a secondary treatment basin 4, and a mass of settled solids 15 that are removed from the bottom of the primary basin 2 and disposed. In one method of secondary treatment known in the art, the secondary basin contains an activated sludge biomass that is aerated and suspended in the secondary basin. The primary effluent 3 mixes with the activated sludge of the secondary basin 4 creating additional settleable solids entrained in a secondary effluent 5.

The secondary effluent 5 flows into a secondary clarifier 6 where additional solids are separated from the remaining effluent. In either the secondary treatment basin 4 or the secondary clarifier 6, chemical coagulants 14 such as alum, ferric chloride or organic polymers are added to aid in settling entrained solids from the secondary effluent 5. Solids separation in the secondary clarifier 6 results in a secondary effluent stream 7 and a waste activated sludge stream 8. A portion of the waste activated sludge 8 flows into a return activated sludge line 9 which is diverted to the upstream side of the secondary treatment basin 4 or reintroduced into the primary effluent 3. The remaining solids 10 from the waste activated sludge stream 8 are collected and disposed.

For further solids removal, particularly for small particle size and low density solids, the secondary effluent stream 7 flows into a tertiary treatment process such as a filtration basin 11. In the example of FIG. 1, the filtration basin contains rotating cloth filters 12 that retain solids above a given particle size on the exterior of the filter 12 while allowing liquid and smaller entrained solids to pass through. The tertiary effluent 13 is discharged to a receiving water. Solids are removed from the filters 12 and collected as a filtered solids waste stream 10 which is disposed in a similar manner as other waste solids.

Figure 2:
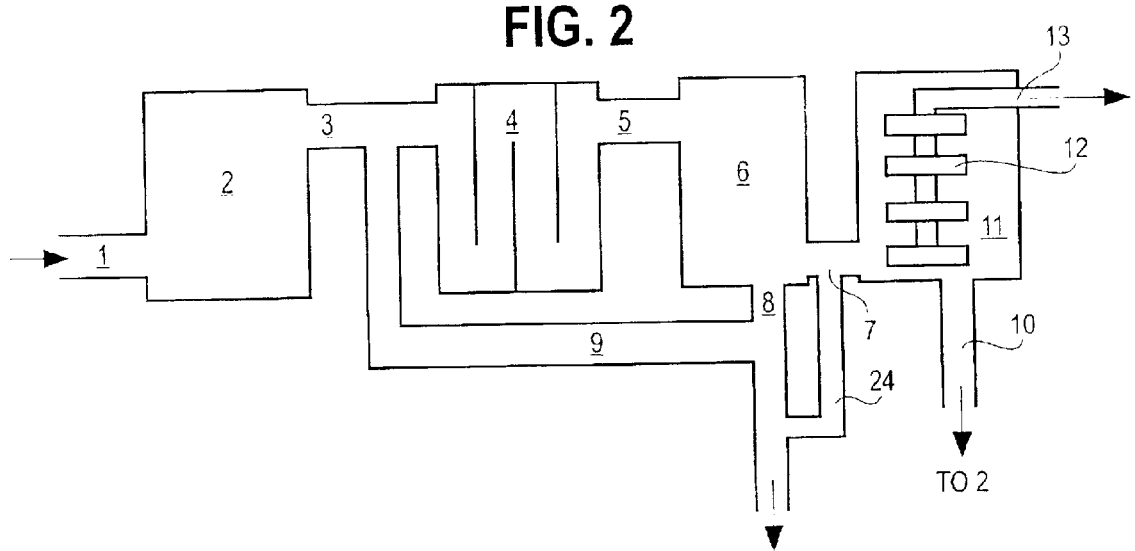
FIG. 2 is a modified process diagram according to the invention where activated sludge is introduced prior to filtration.

In a preferred embodiment of the invention (see FIG. 2), no chemical coagulants 14 are introduced during the treatment process. In lieu of chemical coagulants 14, a return activated sludge feeder 24 is introduced into the secondary effluent stream 7 or, alternatively, into the tertiary treatment basin 11. It is preferred that this return activated sludge feeder 24 runs continuously through a closed conduit in fluid communication with the secondary effluent stream 7. However, it is also recognized as within the scope of the invention to apply the return activated sludge feeder 24 in batches. The preferred final concentration of return activated sludge in the tertiary treatment basin 11 is 2–5 milligrams per liter.

Figure 3:
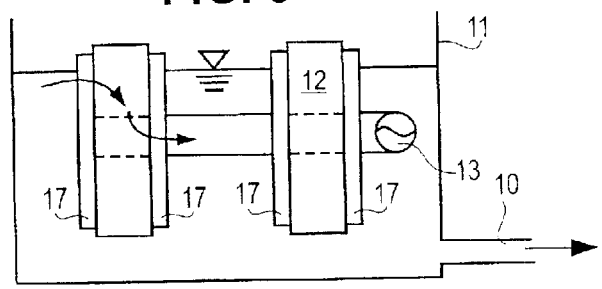
FIG. 3 is a profile view of a filtration basin using rotating disk filters.

The return activated sludge feeder in the tertiary treatment basin 11 acts as a natural flocculent and adsorbs small solids on the biomass. The wastewater in the tertiary treatment basin 11, thickened by the addition of return activated sludge, forms a beneficial cake 17 on the exterior of the filters 12 (see FIG. 3). Since the cake 17 does not have the deleterious characteristics of sludges bearing chemical coagulants, it also acts as a supplemental filter improving solids removal in the tertiary treatment basin 11. To the extent that the return activated sludge feeder 24 replaces the addition of chemical coagulants 14, the net amount of solids generated during tertiary treatment does not increase.

Figure 4:
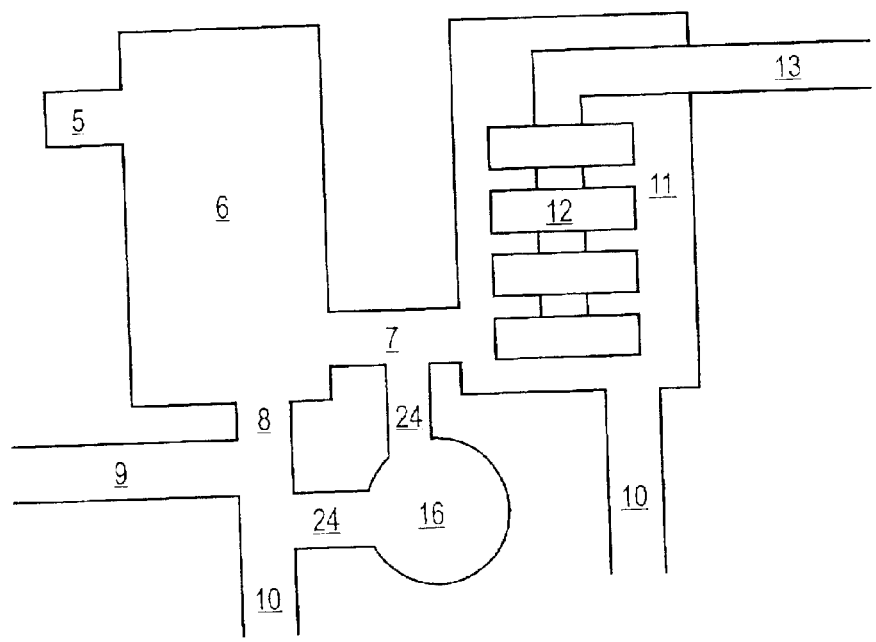
FIG. 4 is a partial process diagram of secondary and tertiary treatment stages with an aerated return activated sludge basin.

In an alternative embodiment (see FIG. 4), the return activated sludge needed for tertiary treatment is stored in an aerated tank 16 adjacent to the tertiary treatment basin 11. It is recognized that whether the return activated sludge is fed continuously or in batches, electronically controlled valves and other instrumentation as known in the art may be installed to automate the process.

The inventions apply to treatment basins of any size or shape. It is also recognized that the invention is equally effective for activated sludge treatment systems where two or more of the treatment stages are combined, where one or more stages is omitted, or in sequencing batch reactors. The preferred return activated sludge concentration of 2–5 milligrams per liter does not disclaim higher or lower concentrations. The preferred concentration has been selected for typical domestic wastes. It is recognized that a typical domestic wastes, commercial wastes and industrial wastes will require limited experimentation to determine the optimal concentration for each application. While in many cases no chemical coagulants 14 are needed, it is also within the scope of the invention to introduce chemical coagulants 14 in quantities lower than conventional treatment practices in combination with the return activated sludge feeder 24 addition to obtain the claimed benefits.

Figure 5:
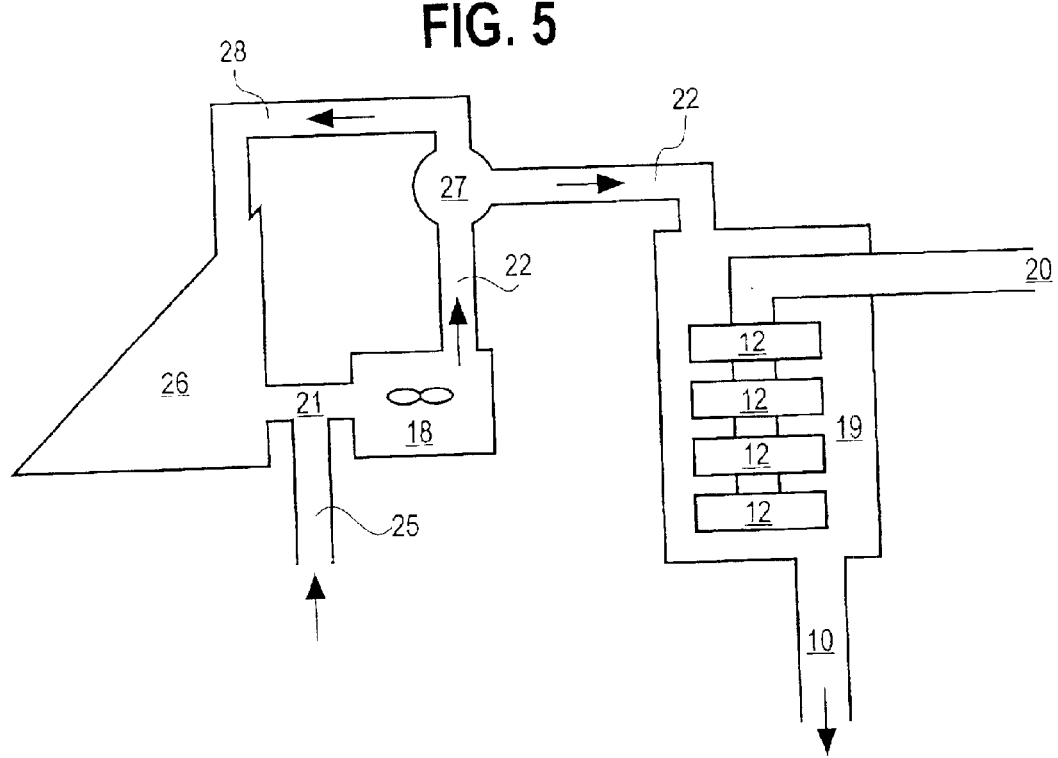
FIG. 5 is a process diagram of a pretreatment process for an equalization basin directed to the removal of algal solids.

In an alternative application of the invention (see FIG. 5), the addition of activated sludge can be used for the preconditioning of algal solids prior to filtration. In a typical system, a non-potable water held in a lagoon 26 or retention pond may develop blooms of algae from the quiescent hydraulic condition and available nutrients. As a substitute for a chemical algaecide, an activated sludge feeder 25 is added to the lagoon effluent 21. The effluent 21 flows into a mixing basin 18 where the return activated sludge interacts with the solids and nutrients to produce a mixed effluent 22 which passes through a clarifying tank 27 to regulate the solids concentration. Excess solids are directed through a return line 28 to the lagoon 26 for additional processing. It is preferred that the activated sludge concentration in the mixed effluent 22 be maintained in the range of 5–10 milligrams per liter. Although this concentration is preferred for typical municipal waste streams, it is recognized that both higher and lower concentrations are contemplated by the invention. The most effective activated sludge concentration for any specific application must be tailored to the specific characteristics of the waste stream being treated.

The mixed effluent 22 flows into a pre-filtration basin 19 containing filter media such as rotating disk filters 12. The return activated sludge in the mixed effluent 22 acts as a natural flocculent and adsorbs small algal solids on the biomass. The wastewater in the pre-filtration basin 19, thickened by the addition of return activated sludge, forms a beneficial cake 17 on the exterior of the filters 12. The pre-filtration process produces a pre-treated effluent 20 that can be directed to the plant's headworks for additional treatment or to a receiving water. Waste solids 10 are disposed in a conventional manner as is known in the art.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. In a wastewater treatment system employing activated sludge, a method for removing solids from a wastewater comprising:

introducing said activated sludge to said wastewater;

clarifying said wastewater after the introduction of said activated sludge;

subjecting said clarified wastewater to additional treatment involving a filtration process; and reintroducing said activated sludge to said clarified wastewater prior to filtration.

2. The method of claim 1 wherein the concentration of said activated sludge in said clarified wastewater is approximately 2–5 milligrams per liter.

3. The method of claim 1 further comprising:

storing said activated sludge in an aerated container in fluid communication with said wastewater treatment system, prior to reintroducing said activated sludge to said clarified wastewater.

4. The method of claim 2 further comprising:

storing said activated sludge in an aerated container in fluid communication with said wastewater treatment system, prior to reintroducing said activated sludge to said clarified wastewater.

5. In a wastewater treatment system employing activated sludge, said system in fluid communication with a detention basin upstream of said wastewater treatment system, said detention basin holding a wastewater containing algae, a method of pretreatment for removing algae from said wastewater comprising:

introducing said activated sludge to said wastewater;

mixing said activated sludge and said wastewater; and subjecting said mixed wastewater to a filtration process.

6. The method of claim 5 wherein the concentration of said activated sludge in said mixed wastewater is approximately 2–5 milligrams per liter.

7. The method of claim 5 further comprising:

storing said activated sludge in an aerated container in fluid communication with said wastewater treatment system, prior to introducing said activated sludge to said mixed wastewater.

8. The method of claim 6 further comprising:

storing said activated sludge in an aerated container in fluid communication with said wastewater treatment system, prior to introducing said activated sludge to said mixed wastewater.

* * * * *